US012589698B2

(12) United States Patent (10) Patent No.: US 12,589,698 B2
Li (45) Date of Patent: Mar. 31, 2026

(54) TRIPLE SLIDING

(71) Applicant: Carman Enterprise Co., Ltd.,
Hangzhou (CN)

(72) Inventor: Xianwei Li, Hangzhou (CN)

(73) Assignee: Carman Enterprise Co., Ltd (CN)

( * ) Notice: Subject to any disclaimer, the term of this
patent is extended or adjusted under 35
U.S.C. 154(b) by 271 days.

(21) Appl. No.: 18/304,578

(22) Filed: Apr. 21, 2023

(65) Prior Publication Data

US 2024/0351529 A1 Oct. 24, 2024

(51) Int. Cl.
B60R 9/10 (2006.01)
B60R 9/06 (2006.01)

(52) U.S. Cl.
CPC . B60R 9/10 (2013.01); B60R 9/06 (2013.01)

(58) Field of Classification Search
CPC ................................. B60R 9/10; B60R 9/06
See application file for complete search history.

(56) References Cited

U.S. PATENT DOCUMENTS

| | | |
|---|---|---|
| 2,019,636 A | 11/1935 | Scrantom |
| 4,823,997 A | 4/1989 | Krieger |
| 5,038,983 A | 8/1991 | Tomososki |
| 5,586,702 A | 12/1996 | Sadler |
| 5,690,259 A | 11/1997 | Montani |
| 5,862,966 A | 1/1999 | Mehls |
| 5,947,357 A | 9/1999 | Surkin |
| 6,047,869 A | 4/2000 | Chiu |

| | | |
|---|---|---|
| 6,089,394 A | 7/2000 | Ziglar |
| 6,152,341 A | 11/2000 | Lemay |
| 6,168,058 B1 | 1/2001 | Janek |
| 6,244,483 B1 | 6/2001 | McLemore |
| 6,491,195 B1 | 12/2002 | McLemore |
| 6,539,895 B2 | 4/2003 | Hoagland |
| 6,866,009 B2 | 3/2005 | Smith, Jr. |
| 7,789,044 B2 | 9/2010 | McGrade |
| 8,047,391 B2 | 11/2011 | Lu |
| 8,496,148 B2 | 7/2013 | Farney |
| 8,763,870 B2 | 7/2014 | Davis |

(Continued)

FOREIGN PATENT DOCUMENTS

| | | |
|---|---|---|
| CN | 118871323 A | 10/2024 |
| DE | 29916746 U | 1/2000 |

(Continued)

OTHER PUBLICATIONS

European Search Report dated Sep. 3, 2021, for Application No.
21176694.4, 6 pages.

(Continued)

*Primary Examiner* — Brian D Nash
(74) *Attorney, Agent, or Firm* — Thorpe North &
Western, LLP

(57) ABSTRACT

The present invention relates to a load carrier, in particular
a load carrier for bicycles and/or luggage, for attachment to
the rear side of vehicle, with a basic structure having a basic
frame and a coupling device for attachment to a vehicle
arranged at a front end of the basic frame, and a sliding
frame for receiving a load, in particular for receiving
bicycles or a luggage box, wherein the sliding frame is
translationally moveable relative to the basic frame between
a retracted front position and an extended rear position.

23 Claims, 11 Drawing Sheets

(56)          References Cited

U.S. PATENT DOCUMENTS

Figure 1:
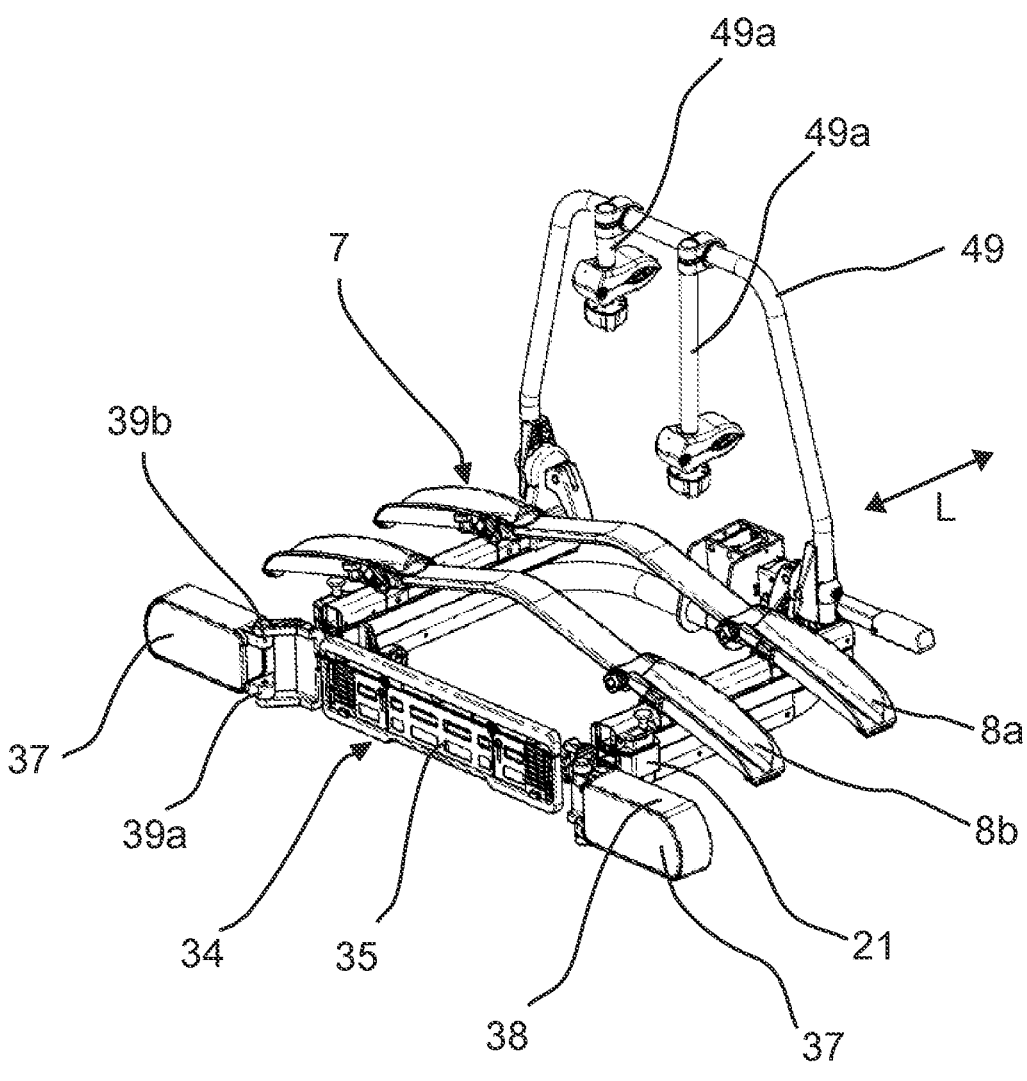

|  |  |  |  |  |
|---|---|---|---|---|
| 9,096,182 | B1 | 8/2015 | Roth et al. | |
| 10,010,048 | B2 | 7/2018 | Kellogg | |
| 10,059,276 | B2 | 8/2018 | Phillips | |
| 10,183,627 | B1 | 1/2019 | Liu | |
| 10,576,903 | B2 | 3/2020 | Rodriguez | |
| 10,967,805 | B2 | 4/2021 | Wang | |
| 11,046,379 | B2 | 6/2021 | Tsai | |
| 11,148,607 | B1 | 10/2021 | Hsieh | |
| 11,240,991 | B2 | 2/2022 | Zhuo | |
| 12,187,236 | B2 | 1/2025 | Huo | |
| 2003/0132259 | A1 | 7/2003 | McLemore | |
| 2003/0222112 | A1* | 12/2003 | McLemore | B60R 9/06 |
| | | | | 224/521 |
| 2008/0006664 | A1 | 1/2008 | Bergerhoff | |
| 2008/0142559 | A1 | 6/2008 | Lim et al. | |
| 2009/0058103 | A1 | 3/2009 | Whitney | |
| 2009/0229093 | A1 | 9/2009 | Zwanenburg | |
| 2011/0108592 | A1 | 5/2011 | Lee | |
| 2011/0132946 | A1 | 6/2011 | Sautter | |
| 2013/0062383 | A1 | 3/2013 | Jeli | |
| 2014/0158729 | A1 | 6/2014 | Pedrini | |
| 2015/0021371 | A1 | 1/2015 | Ward | |
| 2015/0321620 | A1 | 11/2015 | Lungershausen | |
| 2016/0068111 | A1* | 3/2016 | Walker | B60R 9/10 |
| | | | | 224/521 |
| 2017/0349111 | A1 | 12/2017 | Ramsdell | |
| 2018/0072237 | A1 | 3/2018 | Kuschmeader | |
| 2021/0170955 | A1 | 6/2021 | Nusbaum | |
| 2022/0144181 | A1* | 5/2022 | Garai Abrisketa | B60R 9/10 |
| 2022/0153205 | A1 | 5/2022 | Kuschmeader | |
| 2022/0176886 | A1 | 6/2022 | Sailer | |
| 2023/0398944 | A1* | 12/2023 | Li | B60R 9/055 |
| 2023/0398946 | A1* | 12/2023 | Li | B60R 9/10 |
| 2023/0398947 | A1* | 12/2023 | Li | B60R 9/06 |
| 2023/0398948 | A1* | 12/2023 | Li | B60R 9/10 |
| 2024/0253575 | A1* | 8/2024 | Nilvius | B60R 9/06 |
| 2024/0351529 | A1 | 10/2024 | Li | |
| 2024/0399972 | A1* | 12/2024 | Willems | B60R 9/10 |

FOREIGN PATENT DOCUMENTS

|  |  |  |  |
|---|---|---|---|
| DE | 102 57 903 | A1 | 6/2004 |
| DE | 20 2010 016 281 | U1 | 2/2011 |
| DE | 10 2010 012 744 | A1 | 9/2011 |
| EP | 1502818 | A1 | 2/2005 |
| EP | 1 837 240 | A1 | 9/2007 |
| EP | 2 338 739 | A1 | 6/2011 |
| EP | 3 581 436 | A1 | 12/2019 |
| FR | 2 769 880 | A1 | 4/1999 |
| FR | 2905644 | A | 3/2008 |
| JP | 2010042805 | A | 2/2010 |
| JP | 2017-081320 | A | 5/2017 |
| KR | 101 474 661 | B1 | 12/2014 |
| KR | 20240169346 | A | 12/2024 |
| SE | 535620 | C2 | 10/2012 |
| SE | 536070 | C2 | 4/2013 |
| WO | WO 2013/022671 | A1 | 2/2013 |
| WO | WO 2022/064290 | A1 | 3/2022 |

OTHER PUBLICATIONS

European Search Report dated Oct. 2, 2022, for application No. 22184972.2-1009, 7 pages.
International Search Report dated Jan. 16, 2023, for application EP 22184361.8, 6 pages.
International Search Report for European Application No. 2185257.7-1009 dated May 24, 2023, 8 pages.
International Search Report for European Application No. 22185249.4-1009 dated May 24, 2023, 7 pages.

* cited by examiner

TRIPLE SLIDING

The present invention relates to a load carrier, in particular a load carrier for bicycles and/or luggage, for attachment to the rear side of vehicle, with a basic structure having a basic frame and a coupling device for attachment to a vehicle arranged at a front end of the basic frame, and a sliding frame for receiving a load, in particular for receiving bicycles or a luggage box, wherein the sliding frame is translationally moveable relative to the basic frame between a retracted front position and an extended rear position.

Load carriers for fastening to the rear end of a vehicle, in particular a motor vehicle such as a car, are often used for transporting bicycles and/or additional luggage exceeding the capacity of the luggage compartment of the car. Generally, this type of load carrier comprises a coupling device at its front end region which is normally designed so that the load carrier can be fastened to the ball of a conventional trailer coupling. Furthermore, such load carriers for transporting bicycles comprise a carrier frame to which profile rails for receiving the wheels of bicycles are fastened. These profile rails are normally arranged transversely to the direction of travel and substantially horizontally, and comprise fastening means for fixing the bicycles to the profile rail. Other load carriers exist as luggage carries, wherein the carrier frame carries a luggage box, in which luggage, for example suitcases, can be stored.

At such load carriers, it is sometimes considered as disadvantageous that—when mounted to the rear end of a vehicle and provided with bicycles and/or a luggage box—it is difficult or even impossible to have access to the luggage compartment of the vehicle. If, for example, on a longer journey someone would like to take belongings out of the luggage compartment during a break, the load carrier must be disconnected from the trailer coupling and—in most cases—the bicycles must be removed or the luggage must be taken out of the luggage box in order to allow to open the luggage compartment lid.

To avoid this problem and to allow an easy access to the luggage compartment of the vehicle, EP 2 457 777 B1 suggests a load carrier with a basic frame and a sliding frame unit comprising a sliding frame for receiving a load, in particular for receiving bicycles. The sliding frame further carries a license plate holder and two rear light units arranged on both sides of the license plate holder.

The sliding frame unit is movable relative to the basic frame between a retracted front position, in which the sliding frame is aligned with the basic frame, and an extended rear position, in which it is possible to open the luggage compartment lid of the vehicle. In order to bring the sliding frame unit into the extended rear position, the sliding frame is moved linearly backwards and tilted backwards relative to the basic frame, meaning that the movement of the sliding frame relative to the basic frame has two degrees of freedom. In concrete terms, the sliding frame is moved translationally backwards and pivoted backwards in order to bring the load out of the movement range of the luggage compartment lid of the vehicle.

Even if such a load carrier has proven its worth in principle, it is sometimes considered as disadvantageous that the kinematics allowing two degrees of freedom is complicated and that the extended rear position of the sliding frame is not sufficiently far away from the retracted front position so that it is not possible to open luggage compartment lids having a large movement range. Such a large movement range is in particular given when double rear doors are provided at a van.

Therefore, it is an object of the present invention to provide an alternative load carrier, which allows an easy access to the luggage compartment, when mounted, and which is suitable also for luggage compartment lids of vehicles having a large movement range.

This object is solved by a load carrier of the type mentioned above in that at least one intermediate sliding element is arranged between the basic frame and the sliding frame in such a way that the intermediate sliding element is slidingly moveable relative to the basic frame and the sliding frame is slidingly moveable relative to the intermediate sliding element so that the sliding frame is telescopically displaceable relative to the basic frame.

The invention is based on the consideration to provide an intermediate sliding element by means of which a telescopical displacement of the sliding frame relative to the basic frame can be effected. Accordingly, the movement range of the sliding frame relative to the basic frame is extended compared to an arrangement wherein the sliding frame is directly held on the basic frame. Due to this further extension of the sliding frame relative to the basic frame, the load carrier according to the invention can be used for vehicles having a luggage compartment lid with a large movement range. In other words, the bicycles or the luggage box provided on the sliding frame can be positioned in the extended rear position of the sliding frame so far away from the vehicle that they do not interfere with the luggage compartment lid of a vehicle when the latter is opened or closed. The load carrier according to the invention is in particular suitable for vans having a double rear door pivoting about a vertical pivot axis as the relatively long sliding distance achieved by means of the intermediate sliding element allows to bring the sliding frame out of the movement range of such a double rear door.

According to a preferred embodiment of the invention, the displacement distance of the sliding frame relative to the basic frame between its retracted front position and its extended rear position is at least 60 cm. In other words, the sliding frame is movable relative to the basic frame by a distance of at least 60 cm. Such a displacement distance allows to bring the sliding frame and a load arranged thereon out of the movement range of luggage compartment lids or rear doors of vehicles.

Preferably, the displacement distance of the sliding frame relative to the basic frame between its retracted front position and its extended rear position is at least 1.1 times the longitudinal extension of the load carrier, when the sliding frame is in its retracted front position. Accordingly, it is provided that the displacement path of the sliding frame relative to the basic frame is in total longer than the entire extension of the load carrier in its longitudinal direction, i.e. from its front end to its rear end when the sliding frame is in its retracted front position. Such a long displacement path is presently achieved by means of the intermediate sliding element.

According to a preferred embodiment of the invention, each intermediate sliding element comprises an engagement contour on its side facing towards the basic frame and the basic frame has a corresponding complementary counter contour, wherein the engagement contour engages behind the counter contour such that the intermediate sliding element is slidingly moveable relative to the basic frame in a longitudinal direction, but fixed transversely to the longitudinal direction in a form-fit manner. In other words, a form-fit connection between the intermediate sliding element and the basic frame is realized in order to ensure that the intermediate sliding element is slidingly held on the basic frame such that only a translational movement in one direction of the intermediate sliding element relative to the basic frame is possible.

In concrete terms, the engagement contour and the counter contour each may comprise two L-shaped protrusions, which are arranged such that the L-shaped protrusions of the engagement contour engage behind the L-shaped protrusions of the counter contour. Preferably, the L-shaped protrusions of the engagement contour and/or of the counter contour are arranged mirror-symmetrically in particular with respect to a longitudinal center plain of the intermediate sliding element. Each L-shaped protrusion may comprise a first L-leg, which faces towards the other element, and a second L-leg which extends transversely, in particular perpendicularly to the first L-leg. The L-shaped protrusions of the engagement contour and/or the counter contours may be formed such that the first L-legs of a contour extend parallel to each other, whereas the second L-legs face towards each other or face away from each other. For example, the second L-legs of the engagement contour May face away from each other and the second L-legs of the counter contour may face towards each other so that the L-shaped protrusions engage behind each other so that a form-fit connection between the basic frame and the intermediate sliding element is realized.

The sliding frame may comprise assigned to each intermediate sliding element an engagement profile on its side facing towards the intermediate sliding element and the intermediate sliding element may have a corresponding complementary counter profile, wherein the engagement profile engages behind the counter profile such that the sliding frame is slidably moveable relative to the intermediate sliding element in an longitudinal direction, but fixed transversely to the longitudinal direction in a form-fit manner.

In concrete terms, the engagement profile and the counter profile each comprise two L-shaped projections, which are arranged such that the L-shaped projections of the engagement profile engage behind the L-shaped projections of the counter profile. Furthermore, the L-shaped projections of the engagement profile and/or of the counter profile may be arranged in a mirror symmetrical manner with respect to a longitudinal center plane of the intermediate sliding element. The engagement profile and the counter profile may be formed similarly or even identically to the engagement contour and the counter contour. Accordingly, the engagement profile may have the same cross-section as the engagement contour and/or the counter profile may have the same cross section as the counter contour.

According to a preferred embodiment of the invention, the engagement contour and/or the counter contour and/or the engagement profile and/or the counter profile may be provided with a coating. Such a coating can reduce the friction and therefore reduce the force that is necessary to move the sliding frame relative to the basic frame. Such a coating may also be corrosion resistant and/or may cover the entire contour/profile or a part thereof.

In order to ensure a robust and safe movement of the sliding frame relative to the basic frame, the load carrier may comprise two intermediate sliding elements spaced apart from each other and extending parallel to each other. In particular, the intermediate sliding element may be spaced apart from each other laterally. Such a double telescopical connection between the basic frame and a sliding frame is resistant against torsion momentums so that a stable design can be achieved. Accordingly, the sliding frame can comprise two engagement profiles and the basic frame can comprise two counter contours being arranged parallel to each other.

Preferably, the basic frame has a C-shaped structure open towards the rear side, wherein a central C-leg extends transversely to a longitudinal direction of the load carrier and two C-legs extend parallel to each other towards the rear side of the load carrier. In concrete terms, the C-shaped structure may be formed by at least one bent round tube, which is welded at its central C-leg to the coupling device, in particular to a housing of the coupling device. Such a round tube with a circular cross-section is more resistant against bending so that a smooth sliding of the sliding frame relative to the basic frame can be ensured. In particular, the C-shaped structure may comprise two bent tubes which are welded together in the middle of the central C-leg and/or are welded to the coupling device, in particular to a housing of the coupling device.

The counter contour of the basic frame may be formed by an attachment profile, which is plugged onto the basic frame, in particular onto a leg of the basic frame. Accordingly, the counter contour may be formed by a separate piece, which is plucked onto the basic frame. This attachment profile may be an extruded aluminium profile or may be made of made plastic.

The sliding frame may comprise assigned to each intermediate sliding element one sliding profile, which has the engagement profile on its side facing towards the intermediate sliding element and is formed by an extruded aluminium profile.

The intermediate sliding element may be formed by an extruded hollow profile, in particular an aluminium profile. In this way, an easy manufacturing is possible.

The sliding frame may be arranged above the basic frame so that the sliding frame is arranged above the intermediate sliding element and the intermediate sliding element is arranged above the basic frame.

Preferably, the basic frame and the intermediate sliding elements are arranged such that do not protrude above the top of the coupling device. In other words, the intermediate sliding elements and the basic frame are arranged vertically below the top surface of the coupling device when the load carrier is connected to the trailer hitch of a vehicle. In this way, it is ensured that the intermediate sliding element and the basic frame do not interfere with a luggage compartment lid or a rear door of a vehicle.

In order to avoid an unintentional movement of the sliding frame out of its retracted front position, a locking device may be provided by means of which the sliding frame can be locked relative to the basic frame. Preferably, one locking device may be assigned to each intermediate sliding element. Accordingly, if the load carrier comprises two intermediate sliding elements, which are spaced apart from each other and extend parallel, one locking device may be provided at each telescopic sliding guide.

The locking device may comprise at least one locking bolt that is held at the basic frame or the sliding frame so as to be movable between a blocked position and a release position, the locking bolt being pre-loaded in the direction of the blocked position, wherein a mechanism is provided which is automatically activated as the locking bolt is being transferred from the blocked position into the release position and which holds the locking bolt in the release position, so that the sliding frame can be freely displaced with respect to the basic frame, and which, when the sliding frame is being moved into the retracted front position, automatically releases the locking bolt either shortly before or upon reaching the retracted front position, so that the locking bolt is moved into the blocked position and locking takes place.

In an expedient design, the locking device comprises a recess which is provided in the other one of the sliding frame and the basic frame and into which an end area of the locking bolt engages when it is in the blocked position, whereby a reliable securing of the sliding frame on the basic frame can be achieved.

According to a particularly preferred embodiment, a holding element is provided that has a holding section which automatically engages with a projection provided at the locking bolt, when the locking bolt is transferred from the blocked position into the release position. The projection preferably is formed by a retaining ring that encloses the locking bolt and is fixed thereto. The holding element furthermore is preferably held at the one of the sliding frame and the basic frame so as to be moveable between a holding position and a free-running position, in particular so as to be pivotable about a pivot axis, and particularly preferably is pre-loaded in the direction of the holding position.

A spring element assigned to the holding element can be provided for pre-loading the holding element in the direction of the holding position. In the case that the holding element is held so as to be pivotable about a pivot axis, this can in particular be a torsion spring. The same may apply alternatively or additionally to the locking bolt which is pre-loaded in the direction of the blocked position and to which a spring element can be assigned alternatively or additionally, for example a compression spring or coil spring through which the locking bolt extends.

A further preferred embodiment is characterized in that the holding element has a step- or hook-shaped holding section, wherein, when the locking bolt is in the release position and the holding element is in the holding position, particularly preferably a bottom side of the projection provided at the locking bolt rests on a top side of the step- or hook-shaped holding section. This arrangement has proven to be particularly advantageous for holding the locking bolt securely in the release position by means of the holding element. It is further preferable if the arrangement is such that, in the holding position, the top side of the step- or hook-shaped holding section is aligned so as to be at least substantially orthogonal to the locking axis along which the locking bolt is movable between the locking position and the release position as it is held at the one sliding element.

In a further preferred embodiment, the holding element has a tapered section, which preferably tapers into the direction of the other of the sliding frame and the basic frame. The arrangement is then preferably realized in such a manner that the projection provided at the locking bolt is engaged with and moved along the tapered section when the locking bolt is transferred from the blocked position into the release position and the holding element is pressed from the holding position into the free-running position. The tapered section can for example be at least substantially V-shaped. It can further be that the holding element has an arcuate section or a section with an arcuate outside contour with which the projection provided at the locking bolt engages or is engaged if it is moved from the locking position into the release position, wherein the arcuate section is preferably designed in such a manner and the arrangement is realized in such a manner that the projection provided at the locking bolt is moved along the arcuate section or outer contour, and the holding element is in a particular appropriate manner pressed from the holding position into the free-running position when the locking bolt is transferred from the blocked position into the release position. The arcuate outside contour can form one side of the tapered section.

Further, the locking bolt and/or the holding element can be held so as to be movable at an insert element inserted into the sliding frame or the basic frame. The insert element can for example be inserted into a reception area that is provided in the one of the sliding frame and the basic frame and can be attached with fixation means, such as for example screws. If an insert element is provided, it is preferably formed as an at least substantially cuboid hollow body. Alternatively or additionally, the insert element has two aligned bore holes through which the locking bolt extends. The aligned bore holes are in particular provided in two facing walls of the insert element. Further, the insert element and the locking bolt are preferably dimensioned and arranged in such a manner that the locking bolt extends through both aligned holes in the blocked position as well as in the release position.

In a further embodiment of the load carrier according to the invention a releasing element is provided that is held at the other of the sliding frame and the basic frame so as to be movable between a retracted position and a projecting position. The releasing element is preferably pre-loaded in the direction of the projecting position, and in particular has a ramp-shaped end area which preferably rises in a ramp-shaped manner in the direction of the extended end position and engages with an end area of the holding element when the sliding frame is brought from a retracted position into the extended end position, or vice versa. Particularly preferably, the end area of the holding element engages with the ramp-shaped end area of the releasing element shortly before or upon reaching the retracted end position. Alternatively or additionally, it can be provided that in the projecting position the ramp-shaped end area of the releasing element protrudes in the direction of the one of the sliding frame and the basic frame to beyond an edge of the other of the sliding frame and the basic frame.

Assigned to the releasing element is preferably one spring element by means of which the releasing element is pre-loaded in the direction of the projecting position. The spring element can be a compression spring or a coil spring through which a holding pin for the releasing element extends.

The arrangement is preferably such that, when the sliding frame is brought into the extended rear position, the engaging end area of the holding element is moved in the ascending direction across the ramp-shaped end area of the releasing element and presses the releasing element into the retracted position, and/or that, when the sliding frame is brought into the retracted front position, the engaging end area of the holding element abuts against the higher side of the ramp-shaped end section and is thus moved from the holding position into the free-running position, whereby the locking bolt is automatically released.

A pre-loaded releasing element with a ramp-shaped end area makes it possible that, when the sliding frame is moved from the first retracted end position into the second extended end position, the holding element can pass the releasing element without significant resistance, but that its position is changed in the event of a movement in the other direction when it is engaged, in concrete terms is moved from the holding position into the free-running position, whereby the locking bolt is released and automatic locking is achieved.

In a further particularly expedient embodiment, the sliding path of the sliding frame relative to the basic frame is restricted by at least one end position stop at least in the extended end position, preferably being restricted by end position stops in both end positions. For example, the end position stops may be formed by stop blocks, which are fixed to the basic frame, the intermediate sliding element and/or the sliding frame, in particular screwed thereto.

The load carrier may comprise a functional device, which is moveably held at the basic frame, in particular at a rear end section of the basic frame, between a working position, in which the functional device extends at least partially into the movement range of the sliding frame, and a clearance position, in which the functional device is moved out of the movement range of the sliding frame allowing to move the sliding frame into its rear extended position. This embodiment is based on the consideration to provide a functional device, for example a unit comprising a license plate holder and two rear light units, which is not mounted at the sliding frame. Instead, the functional device is mounted at the basic frame. In this way, it is possible to design the sliding frame in a weight-optimized manner.

Furthermore, by mounting the functional device at the basic frame instead of the sliding frame, it is not necessary to provide exposed supply means, for example cables, for supplying the functional device with energy, in particular electrical energy, as the functional device is not moved together with the sliding frame relative to the basic frame. In other words, if the functional device comprises rear light units, exposed cable sections can be avoided as the cable remains at the same place and does not need to be extended.

When the load carrier is mounted to a vehicle and the sliding frame is in its front retracted position, the functional device extends into the movement range of the sliding frame. In particular, the functional device can be positioned behind the sliding frame, when the sliding frame is in its retracted front position. In this situation, the functional device would block the sliding frame. Therefore, it is provided that the functional device can be moved out of the movement range of the sliding frame, thus releasing the sliding frame and allowing a movement into its extended rear position.

According to a preferred embodiment of the invention, the functional device and the sliding frame are coupled such that the functional device is automatically moved into its clearance position, when the sliding frame is moved out of the retracted front position in the direction of its extended rear position, and the functional device is automatically moved into its working position, when the sliding frame is moved into the front transport position. Accordingly, a kinematic coupling between the sliding frame and the functional device is realized such that no independent actuation of the sliding frame and the functional device are necessary but it is sufficient that the sliding frame is moved between the front position and the rear position automatically bringing the functional device out of the movement range of the sliding frame. In other words, the operator only has to move the sliding frame linearly backwards into its extended rear position or to the front into its retracted front position, and this linear movement is translated into a movement of the functional device due to the kinematic coupling.

Preferably, the functional device is pivotally held at the basic frame between its working position and its clearance position about a pivot axis. Such a pivot axis can in particular extend transversely, preferably perpendicularly to the longitudinal direction of the load carrier. In other words, the functional device can be tilted out of the movement range of the sliding frame in order to allow the sliding frame to be moved into its rear position.

It may be provided that the load carrier comprises at least one, in particular two support elements, each support element being fixedly connected to the functional device and pivotably connected to the basic frame. Such support elements form intermediate elements between the functional device and the basic frame working as a lever arm increasing the travel path of the functional device. In other words, the support element(s) are directly connected to the basic frame and to the functional device. In concrete terms, the pivotable connection of the support elements to the basic frame can be realized by a pivot pin protruding from the basic frame and engaging into a corresponding hole of the support element. Such a pivot pin can also have a threaded zone and can in particular be formed as a screw. In this way, the support element(s) can be fixed in the longitudinal direction of the pivot pin at the basic frame and an unintentional movement of the support element in this direction is avoided. It is also conceivable that at least one, in particular each support element comprises a pivot pin, which protrudes and extends into a corresponding hole formed in the basic frame.

In order to limit the movability of the support element and the functional device relative to the basic frame, at least one, in particular each support element has an oblong hole into which a corresponding guide bolt fixedly attached to the basic frame extends. By means of such an oblong hole the movability of the support element can be limited to a defined angular range. The guide bolt extending into the oblong hole defines the limits of this angular range by coming into contact with the ends of the oblong hole. The guide bolt can be fixed to the basic frame, in particular screwed or welded thereto. Preferably, each guide bolt extends parallel to the pivot axis of the support element(s).

In a further elaboration of this embodiment, the oblong hole of at least one, in particular of each support element has a curved shape extending along a circle about the pivot axis. Preferably, the oblong hole of at least one, in particular of each support element is formed such that the guide bolt reaches one end of the oblong hole when the functional device is in its release position. In other words, one end of the oblong hole defines the release position of the functional device and limits the movability in this direction. Accordingly, when the guide bolt reaches this end of the oblong hole, the functional device is out of the movement range of the sliding frame.

According to a preferred embodiment, at least one, in particular each support element comprises two arms, wherein one supporting arm extends from the pivot axis to the functional device and is fixedly connected, in particular screwed, thereto, and wherein the other coupling arm extends from the pivot axis in the direction of the sliding frame. In other words, the support element may have two arms which have different functions. The first supporting arm has the function to support the functional device and to connect this functional device with the basic frame. A second arm extending in the direction of the sliding frame realizes the coupling between the translational movement of the sliding frame and the pivoting movement of the support element and the functional device. The angle between the supporting arm and the coupling arm may be in the range between 70° and 110° and is preferably about 90°.

The sliding frame may comprise at least one pusher dog element, in particular in the form of a pusher dog pin, assigned to a corresponding support element and formed such that it releases the functional device and the support element(s) allowing them to move into their release position, when the sliding frame is moved out of its transport position, and such that it applies a momentum about the pivot axis by pushing against the coupling arm of the support element in order to bring the functional device into its working position, when the sliding frame is moved into its retracted front position.

Accordingly, the coupling between the translational movement of the sliding frame and the pivoting movement of the support element(s) and the functional device is realized by a pusher dog mechanism. When the sliding frame is moved from its retracted front position into its extended rear position, the pusher dog element bearing against the coupling arm of the at least one support element releases this coupling arm allowing the functional device to move out of the movement range of the sliding frame. The clearance position of the functional device is determined by the guide bolt being in contact with the end of the oblong hole formed in the support element. When the sliding frame is moved from the extended rear position into its retracted front position the pusher dog element comes into contact with a corresponding contact surface formed at the coupling arm of the support element. The pusher dog element pushes against this contact surface of the coupling arm of the support element applying a momentum such that the functional device is brought into its working position. When the sliding frame has reached its front transport position, the functional device is held in its working position by the contact of the pusher dog element with the coupling arm of the support element.

According to preferred embodiment of the invention, the functional device projects to the rear side from the basic frame and from the pivot axis such that the functional device is moved into its clearance position by gravity force when the pusher dog element releases the functional device and the corresponding support element. Hence, the functional device is tilted downwardly by the gravity force when such a movement is possible due to the movement of the pusher dog element backwards. Such a movement based on gravity force is advantageous as no other elements applying a momentum on the support elements and the functional device is necessary and a risk of a malfunctioning is significantly decreased.

Preferably, the basic frame has a C-shaped structure open to the rear side. It may be provided that the load carrier comprises exactly two support elements, wherein each C-leg of the basic frame holds one support element in a pivotable manner at its rear end section, wherein the support elements are in particular arranged at the inner sides of the C-legs. Such a fixation of the functional device and the support elements at two laterally spaced apart C-legs allows a stable construction of the load carrier and a stable and reliable fixation of the functional device at the basic frame. The support elements being arranged at the inner sides of the C-legs are advantageous as the risk of damaging by external forces is minimized.

The functional device may comprise a basic carrier element and two rear light units, each of which is held at the basic carrier element and each of which can be pivoted about a pivot axis relative to the basic carrier element between a use position, in which the rear light units are folded out and project in the transverse direction from the basic carrier element, and a transport position in which the rear light units are folded in behind the basic carrier element. In order to hold the rear light units, holding members may be provided at the basic carrier element.

Preferably, bearing means are provided for pivotably bearing the rear light units. The bearing of the rear light units at the holding members may be formed as a sliding bearing. Such a sliding bearing allows an easy design with only a few components, wherein a small resistance by friction is ensured when the rear light units are pivoted.

According to a further embodiment of the invention, the holding members have a C-shaped basic shape, wherein the respective rear light unit is pivotably arranged between the C-legs. By means of such a C-shaped design of the holding members, the rear light units can be gripped from both sides, in particular from an upper and a lower side in order to allow an easy and safe bearing and a stable fixation at the holding members. Preferably, the connecting webs of the holding members face to each other. Accordingly, the C-shaped holding members are transversely open to opposite directions. Preferably, the C-legs are directed obliquely backwards and transversely outwards.

In concrete terms, the bearing means may comprise hinge pins which engage in corresponding bearing bores. Basically, these hinge pins can be provided at the rear lights units extending into corresponding bearing bores of the holding members, in particular in their C-legs. Principally, it is also conceivable that the hinge pins are provided and fixed to the holding members, in particular their C-legs and extend into the rear light units.

According to a preferred embodiment, the hinge pins are designed as screws. In this way, an easy manufacturing and assembly of the rear load carrier is possible.

The rear light units may each have a basic body, in particular a one-piece basic body. A basic body forming the outer contour of the rear lights units allows a robust design and protects the electric components inside against mechanical influences, water and dust. By means of a one-piece basic body, a leak-proof design is ensured and the risk of unintended intrusions is minimized.

The basic body of the rear light units may each carry two projections which protrude between the C-legs of the holding members. Such protrusions allow a weight-effective design of the rear light units and lead to a free space between these projections, which facilitates the assembly of the rear load carrier.

In a further elaboration of this embodiment, the bearing means comprise two hinge pins which are oriented coaxially to one another, are each arranged at one of the projections and engage in corresponding bearing bores in the C-legs of the holding members. In other words, each rear light unit may have two bearing areas, namely an upper bearing area and a lower bearing area. In the upper bearing area, a hinge pin protrudes upwardly from this projection and engages into a bearing bore in the upper C-leg of the corresponding holding member. In the lower bearing area, a hinge pin protrudes from the bottom projection and engages downwardly into a corresponding bearing bore in the lower C-leg of the holding member. In this way, a two-point-bearing is realized and, due to the free space between the projections, an easy accessibility is given as well as the assembly is facilitated.

Preferably, the use position and the transport position of the rear light units are offset relative to one another by a pivoting angle of at least 160°, in particular of at least 170°, preferably of 180°.

A locking mechanism may be assigned to each rear light unit, said locking mechanism being designed to lock the rear light unit in its transport position and in its use position. By locking the rear light unit in its transport position and in its use position, the rear light units are safely positioned and operating errors can be avoided.

Preferably, the locking mechanism comprises an engagement element which is displaceable along the pivot axis of the respective rear light unit between an enabling position, in which the rear light units are freely pivotable and a locking position, in which the rear light units are locked relative to the base body. This embodiment is based on the consideration to provide an engagement element that, in one position, locks the rear light units relative to the base body, in particular relative to the corresponding holding member, and, in a second position, releases the rear light unit so that it can be pivoted freely by the operator.

In a further elaboration of this embodiment, the engagement element is coupled in a rotationally fixed manner to the respective rear light unit. Accordingly, the engagement element cannot rotate relative to the rear light unit. In order to realize the rotationally fixed coupling of the engagement element relative to the respective rear light unit, at least one guiding recess, in particular a plurality of guiding recesses may be formed in the engagement element. These guiding recesses may extend from one end surface, in particular a bottom end surface, of the engagement element into the latter, which means that the guiding recesses are open towards one end face of the engagement element. In particular, the engagement element may comprise in total three guiding recesses distributed uniformly over the circumference of an inner surface of the engagement element, in particular to a central opening. These guiding recesses are preferably in engagement with corresponding guiding protrusions formed in the rear light unit.

The engagement element may be arranged in a recess of the respective rear light unit, said recess being open towards the corresponding holding member. Accordingly, the engagement element is provided in the rear light unit. Preferably, the holding members have a C-shaped basic shape with outwardly pointing C-legs and the recess is open towards and upper C-leg of the holding member. By arranging the engagement element in a recess open towards an upper C-leg, the locking mechanism is preferably arranged in an area of the rear load carrier upwardly open and, therefore, is easily accessible for the operator from above.

Furthermore, a guide groove open towards the corresponding holding member and extending in an annular manner around the pivot axis may be formed in the recess, in which guide groove a corresponding guide projection of the engagement element engages. An annular projection engaging into a corresponding guide groove presents a simple and effective way to guide the engagement element in the corresponding rear light unit and minimizes the risk of canting.

In an end face directed towards the corresponding holding member, the engagement element may have an engaging contour which is or can be brought into positive engagement with a corresponding counter-contour on the holding member in its locking position. Accordingly, a form-fit connection between a contour formed at the engagement element and a corresponding counter-contour formed in the corresponding holding member, in particular in a C-leg, preferable in an upper C-leg of the holding member may be used to lock the rear light unit in its transport position and in its use position.

In concrete terms, the engaging contour may comprise two engagement grooves, which extend rectilinearly and radially to the pivot axis and, in particular, lie opposite to one another with respect to the pivot axis. The engagement grooves may have a rectangular cross-section and may have a radially outwardly from the pivot axis increasing groove depth, in particular a linearly increasing groove depth. The corresponding counter-contour formed on the holding member preferably has a shape complementary to the engagement contour. Such engagement grooves are easy to manufacture and allow a safe and reliable engagement and, thus, locking with a corresponding counter-contour. By means of a linearly increasing groove depth, the engagement element is furthermore centered with regard to the holding member when a corresponding counter-contour having protrusions with an increasing height is formed at the holding member. Grooves and a corresponding counter-contour extending rectilinearly radially to the pivot axis and lying opposite to one another ensure an offset of 180° of the rear light units between the use position and the transport position.

According to a preferred embodiment, the engagement element is pretensioned in the direction of its locking position. Accordingly, the operator must intentionally bring the engagement element out of its locking position, when the rear light unit should be pivoted.

In order to realize the pretensioning of the engagement element, a spring element, in particular a helical compression spring, may be arranged in the guide groove of the rear light unit, wherein said spring element is supported against the base of the guide groove and the guide projection of the engagement element. In this way, the spring element, which pretensions the engagement element in the direction of its locking position, is completely surrounded by the engagement element and the rear light unit and, therefore, protected against the intrusion of dust and other contamination.

The engagement elements may have a central through-opening, which is penetrated by a hinge pin. In other words, the corresponding hinge pin, which is necessary for the bearing of the rear light units at the holding members, may penetrate through the engagement element and, accordingly, also guide the engagement element.

The locking mechanism may further comprise an actuating element which is movable and interacts with the engagement element in such a way that the actuating element is movable between a detent position, in which the engagement element can move into its locking position, and an actuating position, in which the engagement element is in its enabling position. Such an actuating element allows the operator to bring the engagement element intentionally out of its locking position, thus releasing the rear light unit.

According to a preferred embodiment of the invention, the actuating element is movably arranged at the corresponding holding member. Preferably, the holding members may have a C-shaped basic shape with outwardly pointing C-legs and the actuating element is arranged at an upper C-leg of the holding member. In this way, the actuating element is accessible from the outside, in particular from above, for the operator allowing an easy handling.

In concrete terms, the actuating element may be designed as a push button. Hence, the operator only must push, in particular from above, on the actuating element in order to bring the engagement element into its enabling position, thus releasing the rear light units and allowing to pivot them.

The actuating element may be connected in an axially fixed manner to a hinge pin. In this way, the hinge pin moves together with the actuating element. The fixation in an axially fixed manner can, for example, be realized by screwing the actuating element on a thread provided at the hinge pin and/or by a force-fit or form-fit press connection.

In a manner generally known per se, the actuating element may have an annular bearing groove which is formed concentrically to the pivot axis, wherein said bearing groove is open towards the rear light unit and a corresponding bearing projection of the holding member engages into this bearing groove. Such an annular bearing groove as well as a, in particular, annular bearing projection is easy to manufacture and ensures that the actuating element cannot cant relative to the holding member.

In order to realize the interaction between the actuating element and the engagement element, the actuating element may comprise a contact surface facing the rear light unit, which contact surface rests flat against the engagement element or can be brought into contact with the engagement element. This design is based on the consideration that the actuating element, which may in particular be formed as a push button, is pressed against the pretension of the engagement element in order to bring the engagement element out of its locking position. When the operator stops to push on the actuating element, the engagement element is free to move back into its locking position as soon as the rear light unit is positioned in such a way that the engaging contour comes—in its transport or in its use position—into engagement with the corresponding counter-contour, which is preferably formed at the holding member.

The transverse carrier element may carry a license plate holder. In this way, the license plate holder is arranged transversely between the holding members and the rear light units, when the rear light unites are in their use position.

Figure 2:
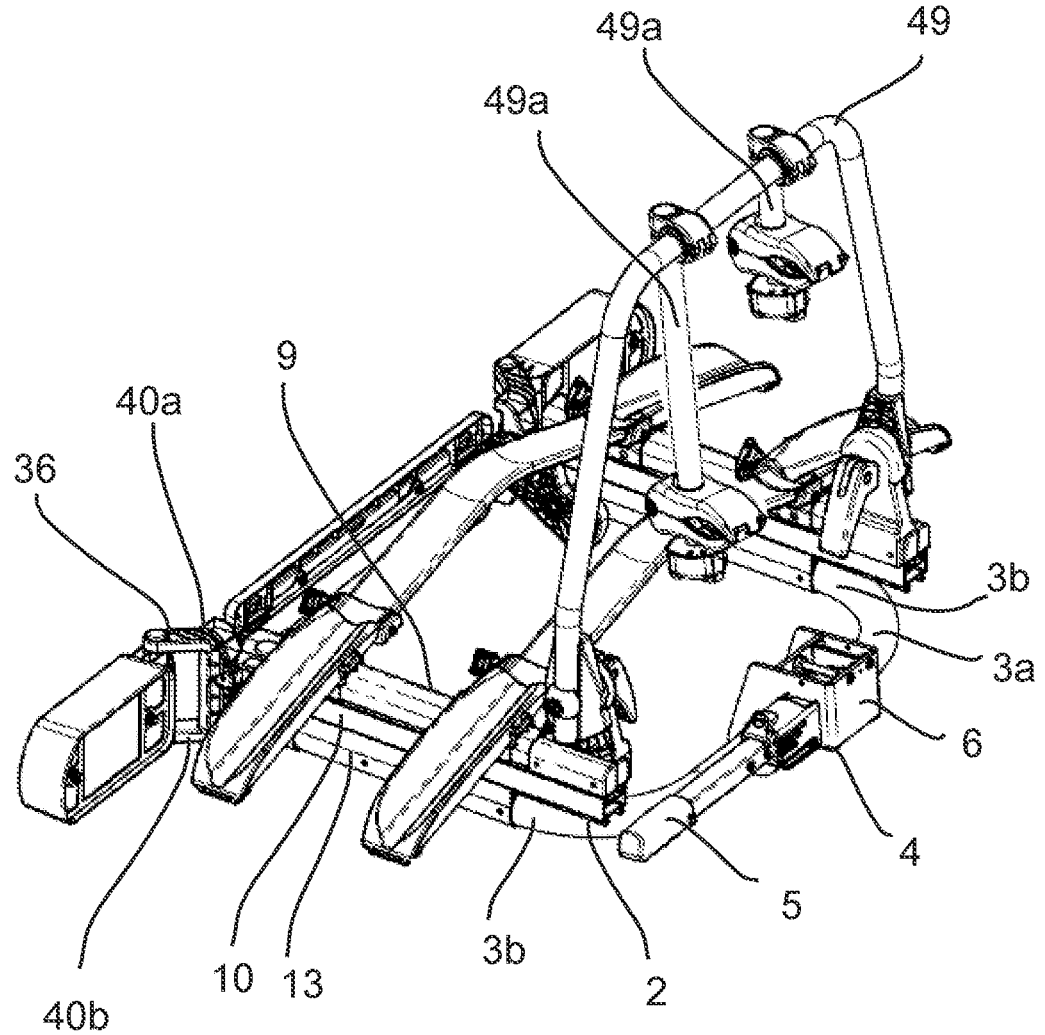
Figure 3:
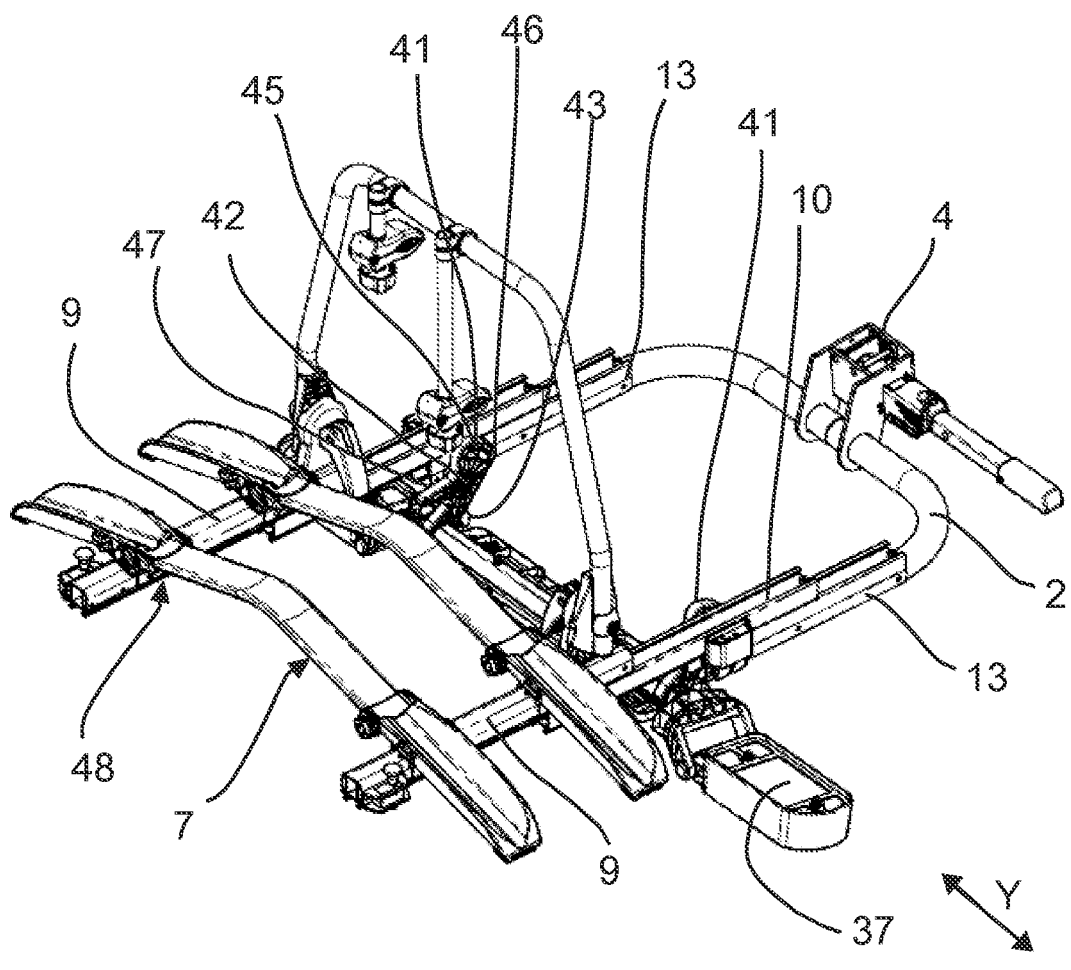
Figure 4:
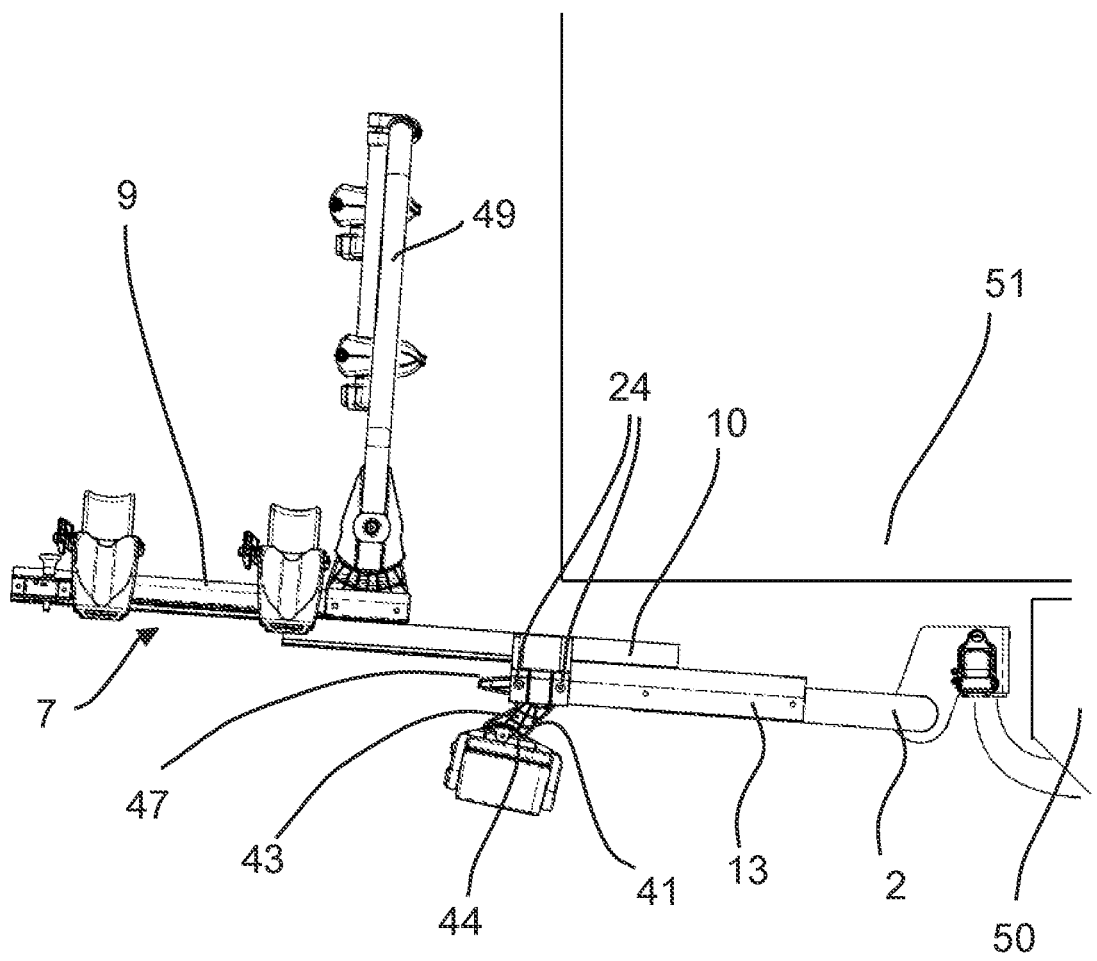
Figure 5:
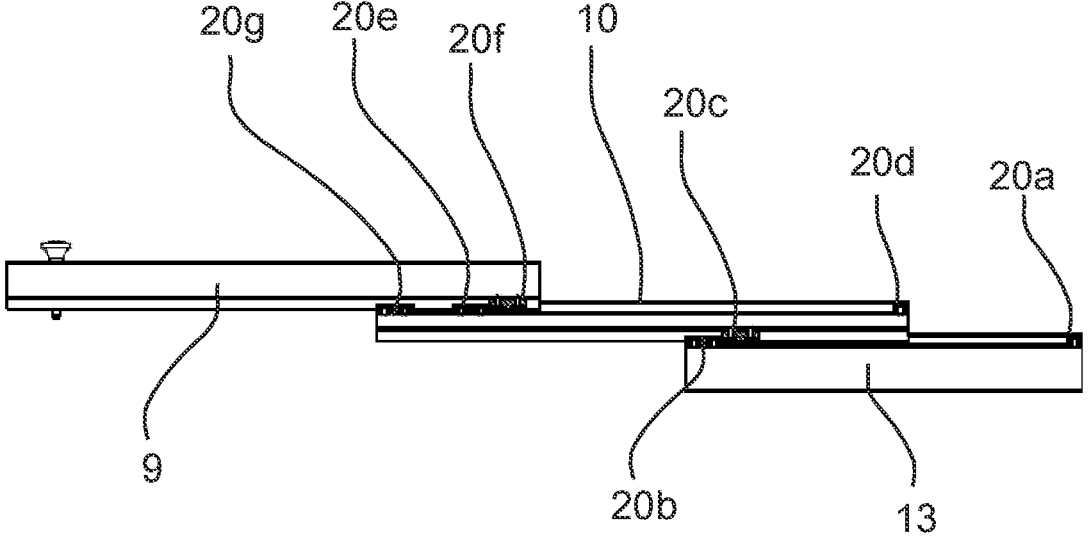
Figure 6:
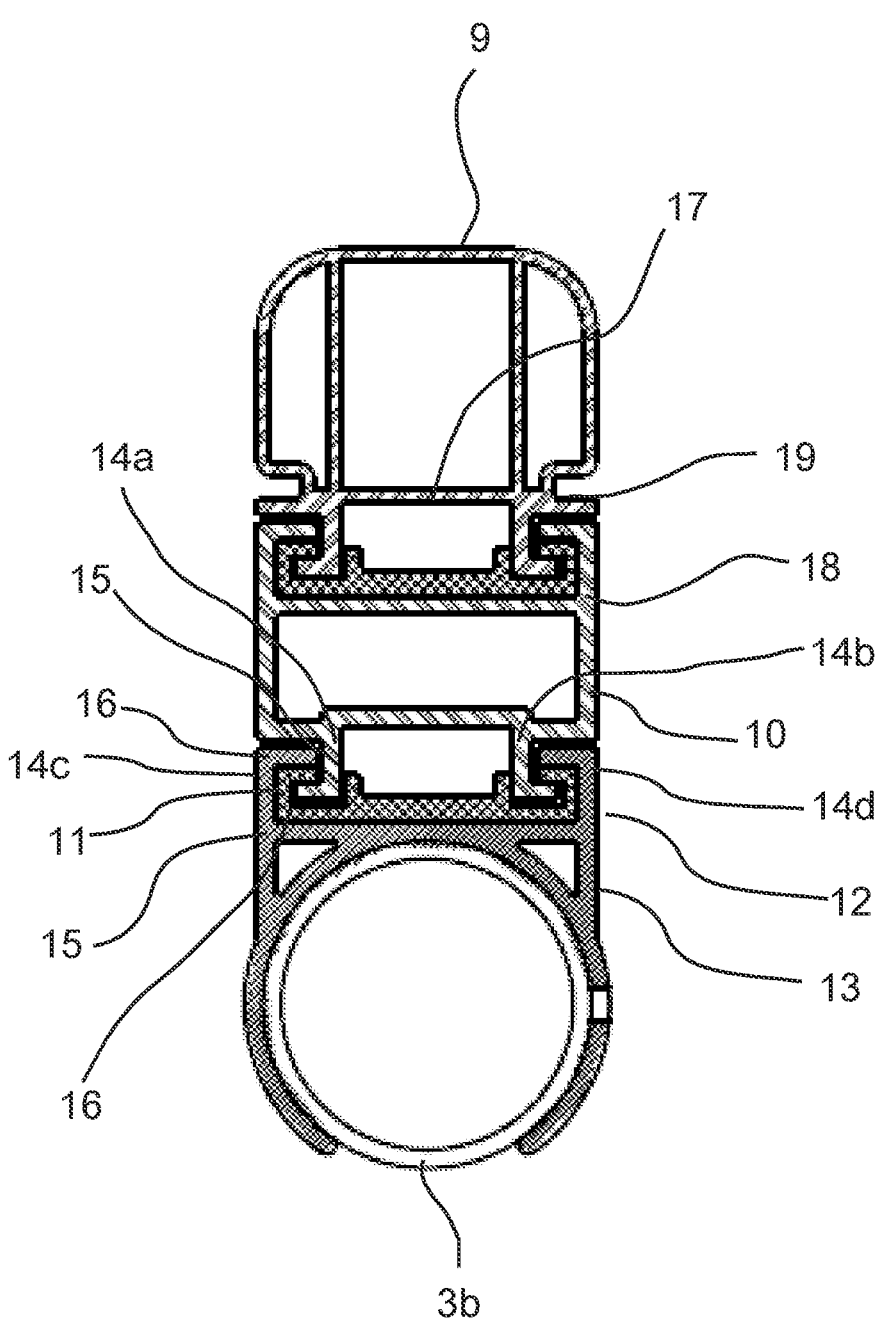
Figure 7:
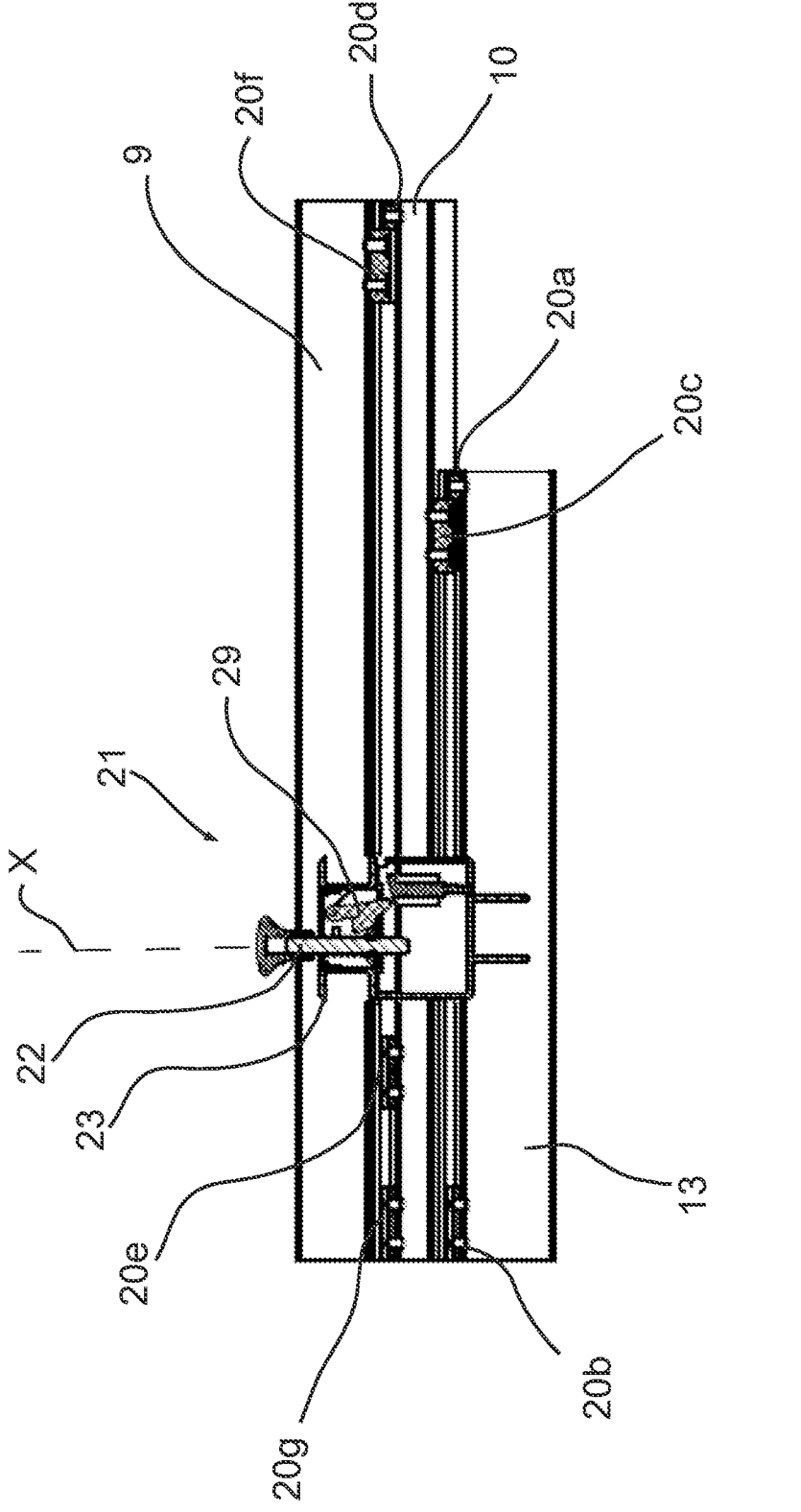
Figure 8:
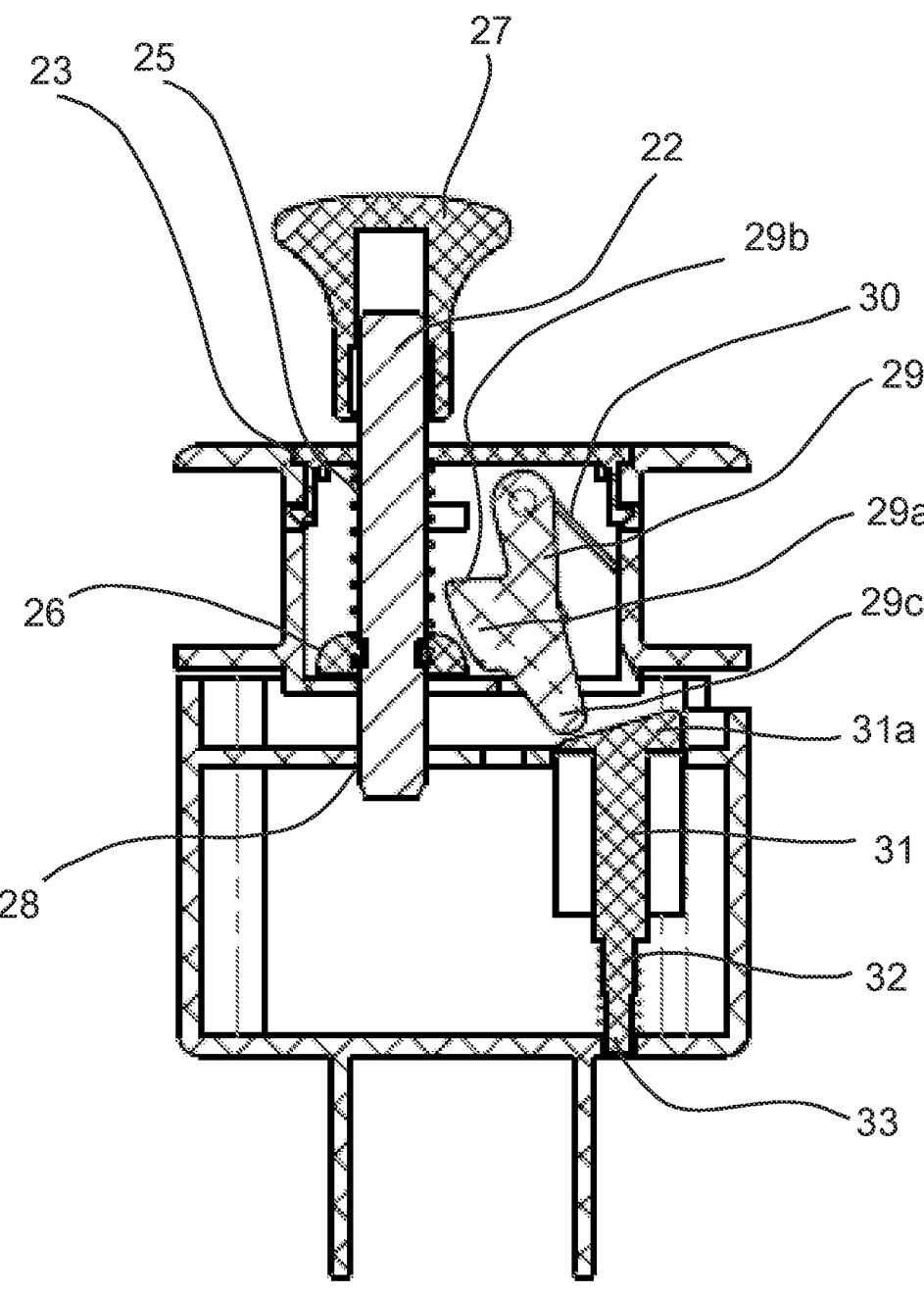
Figure 9:
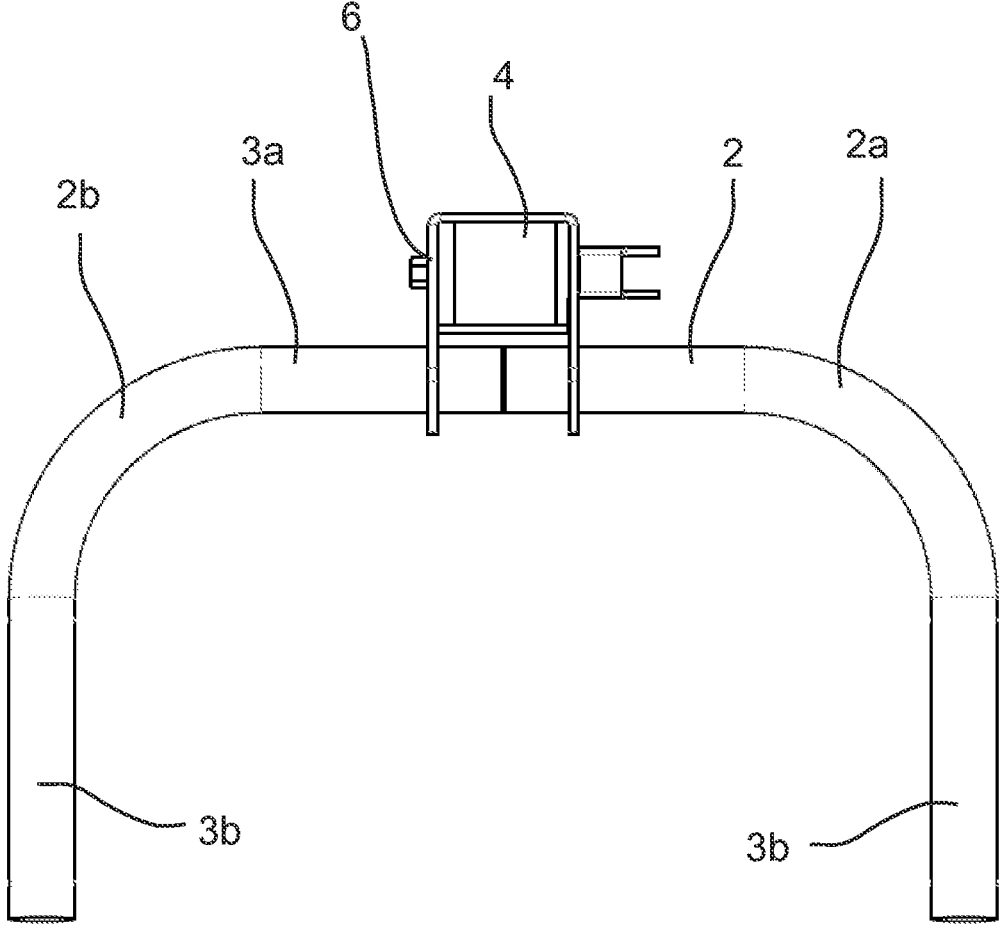
Figure 10:
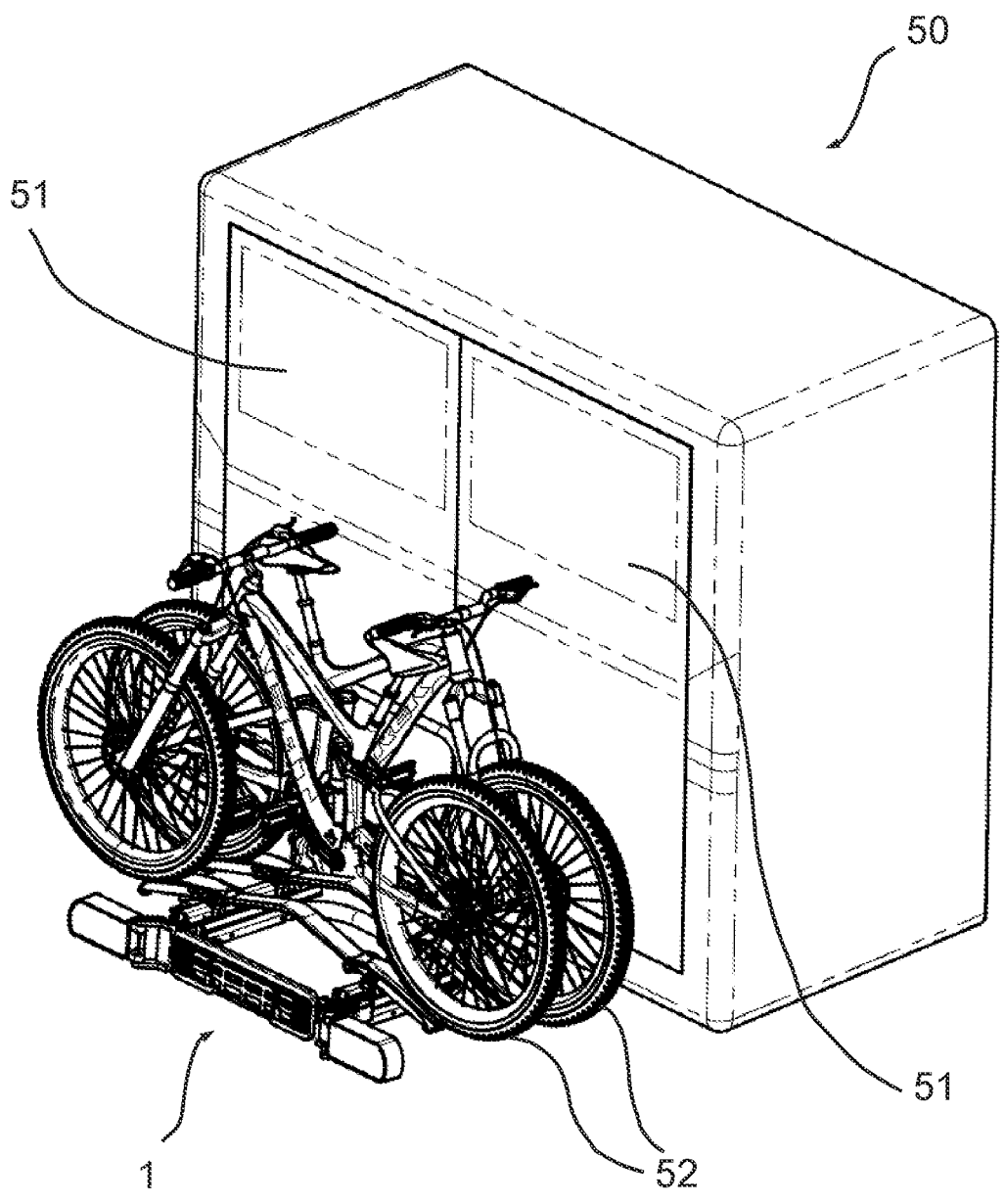
Figure 11:
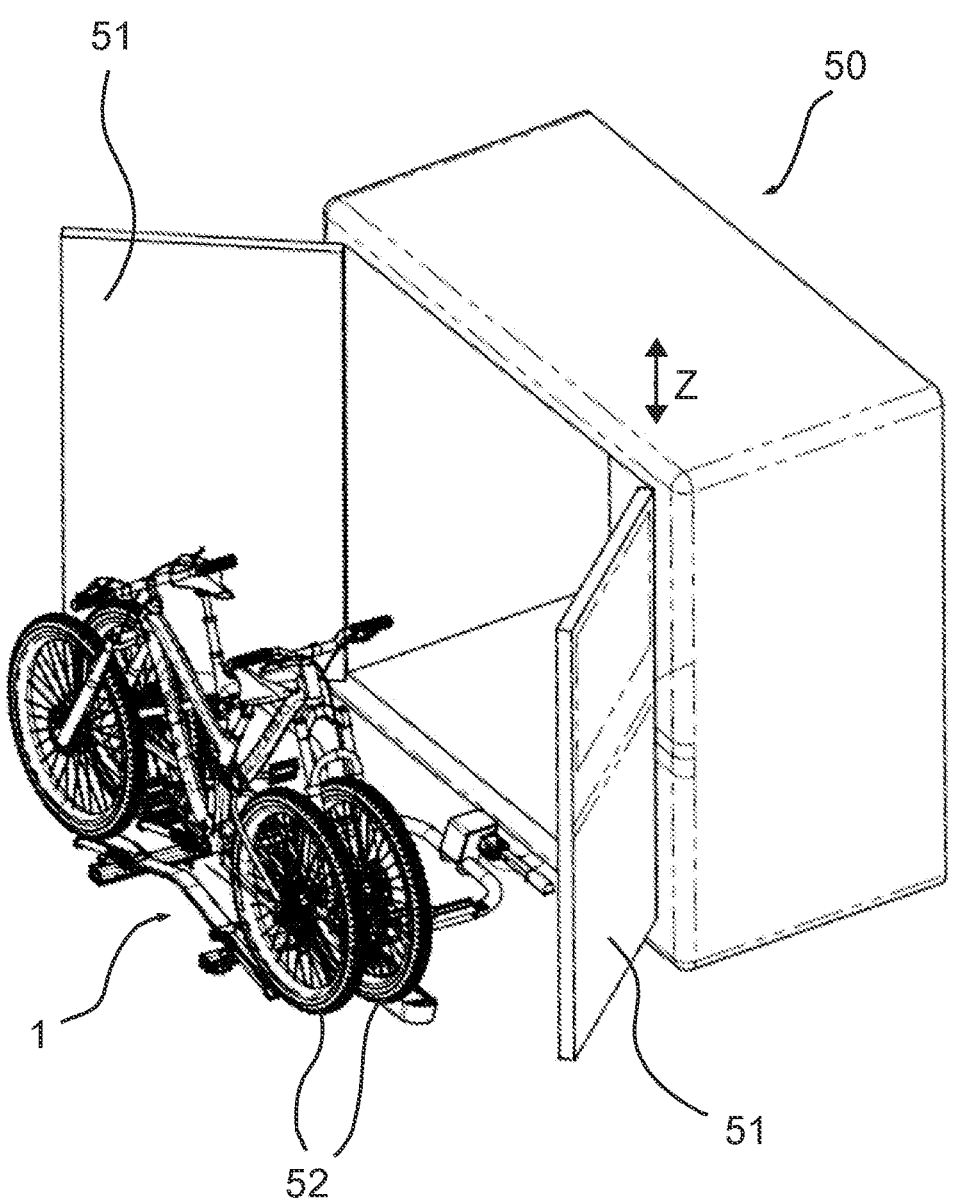

With regard to the embodiment of the invention, references also made to the sub-claims and to the following description of an exemplary embodiment with reference to the attached drawings. In the drawing shows:

FIG. 1 a rear load carrier according to the invention in a perspective view, wherein the sliding frame is in the retracted front position;

FIG. 2 the rear load carrier of FIG. 1 in another perspective view;

FIG. 3 the rear load carrier of FIG. 1, wherein the sliding frame is in the extended rear position, in a perspective view;

FIG. 4 the rear load carrier of FIG. 3 in a side view;

FIG. 5 the basic frame, the intermediate sliding element and the sliding frame of the rear load carrier of FIG. 1 in a side view;

FIG. 6 the sliding frame, the intermediate sliding element and the basic frame of the rear load carrier of FIG. 1 in a cross-sectional view;

FIG. 7 the basic frame, the intermediate sliding element and the sliding frame with the locking device of the load carrier of FIG. 1 in a side view;

FIG. 8 a locking device of the rear load carrier shown in FIG. 1;

FIG. 9 the basic frame and the coupling device of the load carrier shown in FIG. 1;

FIG. 10 a rear section of a vehicle with the load carrier of FIG. 1, wherein the compartment lid of the vehicle is closed; and FIG. 11 the arrangement of FIG. 9, wherein the luggage compartment lid of the vehicle is opened.

FIGS. 1 to 4 show a load carrier 1 for bicycles according to the invention. The load carrier 1 comprises a basic frame 2, which is shown in detail in FIG. 9. This basic frame 2 is formed by two bent tubes 2a, 2b having a circular cross-section. The tubes 2a, 2b form a C-shaped structure of the basic frame 2 open to the rear side. This structure has a central C-leg 3a extending transversely to a longitudinal direction L and two C-legs 3b, which extend parallel to each other towards the rear side.

At a front end of the basic frame 2, a coupling device 4 for attachment to a vehicle is arranged. In concrete terms, the coupling device 4 is formed such that it can engage in a force-fit manner around the ball of a trailer coupling of a vehicle. The coupling device 4 comprises a lever 5 for manual operation and a housing 6 including a coupling mechanism. The housing 6 is welded to the central C-leg 3a of the basic frame 2, presently to each of the bent tubes 2a, 2b.

The load carrier 1 further comprises a sliding frame 7 for receiving bicycles. In concrete terms, the sliding frame 7 comprises two carrier parts 8a, 8b which are designed as profile rails and extend substantially in the transverse direction. They are arranged offset to one another in the longitudinal direction L and are screwed to two sliding profiles 9. These sliding profiles 9 are arranged parallel to each other and are translationally moveable relative to the basic frame 2 between a retracted front position shown in FIGS. 1 and 2 and an extended rear position shown in FIGS. 3 and 4.

Between each sliding profile 9 and the corresponding C-leg 3b, which is positioned below the sliding profiles 9, an intermediate sliding element 10 is arranged. The intermediate sliding elements 10 are slidingly moveable relative to the basic frame 2 and the sliding profiles 9 are slidingly moveable relative to the intermediate sliding elements 10, so that the sliding frame 7 is telescopically displaceable relative to the basic frame 2. The intermediate sliding elements 10 and the basic frame 2 are arranged such that they do not protrude above the top of the housing 6 of the coupling device 4 in order to not interfere with a rear door of a van. The displacement distance of the sliding frame 7 relative to the basic frame 2 between its retracted front position and its extended rear position is presently at least 60 cm.

In order to realize this telescopically displacement, the intermediate sliding elements 10 comprise an engagement contour 11 on their side facing towards the basic frame 2, which has a corresponding complementary counter contour 12. Each counter contour 12 is formed by an attachment profile 13 which is plugged onto the C-legs 3b of the basic frame 2 and is formed by an extruded aluminium profile.

The engagement contour 11 and the counter contour 12 each comprise two L-shaped protrusions 14, which are arranged such that the L-shaped protrusions 14a, 14b of the engagement contour 11 engage behind the L-shaped protrusions 14c, 14d of the counter contour 12. In concrete terms, as it is visible on FIG. 6, the L-shaped protrusions of the engagement contour and the L-shaped protrusions 14c, 14d of the counter contour 12 are arranged mirror symmetrically with respect to a longitudinal center plane of the intermediate sliding elements 10. The L-shaped protrusions 14a, 14b of the engagement contour 11 and the L-shaped protrusions 14c, 14d of the counter contour 12 each comprise one first L-leg 15, wherein both first L-legs 15 of the engagement contour and both first L-legs 15 of the counter contour extend parallel to each other respectively. At the free end of the first L-legs, second L-legs 16 are provided which extend perpendicularly to the corresponding first L-leg 15. At the engagement contour 11, the second L-legs 16 are arranged such that they face away from each other, whereas the second L-legs 16 of the corresponding counter contour 12 face towards each other so that the L-shaped protrusions 14a, 14b of the engagement contour 11 engaged behind the L-shaped protrusions 14c, 14d of the counter contour 12. In this way, the intermediate sliding element 10 is slidingly movable relative to the basic frame 2 in the longitudinal direction L, but fixed transversely to the longitudinal direction L in a form-fit manner.

On its bottom side facing towards the intermediate sliding element 10, each sliding profile 9 comprises an engagement profile 17. The intermediate sliding elements 10 have on their upper side a complementary counter profile 18, so that the engagement profile 17 engages behind the counter profile 18 such that the sliding frame 7 is slidingly movable relative to the intermediate sliding element 10 in the longitudinal direction L, but fixed transversely to the longitudinal direction L in a form-fit manner.

The engagement profile 17 and the counter profile 18 are formed identically to the counter contour 12 and the engagement contour 11. In concrete terms, the engagement profile 17 and the counter profile 18 each comprise two L-shaped projections 19a, 19b, 19c, 19d, which are arranged such the L-shaped projections 19, 19b of the engagement profile 17 engaged behind the L-shaped projections 19c, 19d of the counter profile 18.

As it is visible in FIG. 5, the sliding paths of the sliding profiles 9 relative to the intermediate sliding elements 10 and the sliding paths of the intermediate sliding elements 10 relative to the basic frame 2 are restricted by several end position stops formed as stop blocks 20. These stop blocks are screwed to the intermediate sliding element 10, the sliding profiles 9 and the attachment profile 13, so that the movement of the sliding frame 7 relative to the basic frame 2 is limited between the retracted front position and the extended rear position. As it is visible in FIG. 5, the stop blocks 20a and 20b are fixed to the basic frame 2 and interact with the stop block 20c fixed to the intermediate sliding element 10 so that the movement of the intermediate sliding element 10 with respect to the basic frame 2 is limited by the stop blocks coming into contact. In the same manner, the stop blocks 20d and 20e fixed at the top of the intermediate sliding element 10 interact with the stop block 20f fixed to the sliding frame 7, so that the sliding path of the sliding frame 7 relative to the intermediate sliding element 10 is defined by the stop block 20f getting into contact with the stop block 20d and 20e. Accordingly, the stop block 20a abuts against stop block 20c and stop block 20d abuts against stop block 20f, when the sliding frame 2 is in its retracted front position. When the sliding frame 2 is in its extended rear position, as shown in FIG. 5, stop block 20b abuts against stop block 20c and stop block 20e abuts against stop block 20f. Stop block 20g arranged at the rear end of the intermediate sliding element 10, backwards of stop block 20e, works as an additional safety mechanism.

A locking device 21 is assigned to each sliding profile 9. Each of the two locking devices 21 comprises a locking bolt 22 that is held at the sliding profile so as to be movable between a blocked position and a release position. In concrete terms, the locking bolt 22 is mounted at the sliding profile so as to be movable along a locking axis X, wherein it extends through two aligned bores that are provided in an insert element 23 that is fixed to the sliding profile 9 by means of two screws 24. As it can be seen in FIGS. 7 and 8, the two aligned bores are provided at the facing walls of the insert element 23. Their inner circumference is adjusted to the outer circumference of the locking bolt 22 with play, so that it can slide along the locking axis X through the bores. FIG. 7 shows the locking bolt 21 in the blocked position. The locking bolt 22 is pre-loaded in the direction of the blocked position by means of a coil spring 25 that can in particular be seen in the enlarged rendering of FIG. 8. At the locking bolt 22, a ring 26 enclosing the same is affixed, which in the blocked position rests at the top side of the lower wall of the insert element 23, so that the locking bolt 22 cannot be moved further downwards. A movement upwards is also restricted by the ring 26 and the coil spring 25.

At the free end of the locking bolts 22 that point upwards in the Figures a handle 27 is fixated, which facilitates a convenient release of the locking by a user.

In the blocked position, the locking bolt 22 meshes into a locking recess 28 that is provided at the basic frame 2 in the form of a through bore, whereby it is avoided that the sliding profile 9 can be displaced against the basic frame 2.

What is further provided is a mechanism which is automatically activated as the locking bolt 22 of the respective locking device 21 is transferred by a user from the blocked position into the release position, holding the locking bolt 22 in the release position, so that the sliding frame 7 can be freely displaced against the basic frame 2, and which, when the sliding frame 7 is moved from a completely or partially extended position into the retracted front position, automatically releases the locking bolt 22 shortly before or upon reaching the retracted front position, so that the locking bolt 22 is moved into the blocked position, and the respective sliding profile 9 is automatically locked.

The mechanism comprises a holding element 29 that is held at the insert element 23 in a movable manner. In concrete terms, it is held at the insert element 23 so as to be pivotable about a pivot axis, which extends perpendicular to the drawing plane, between a holding position and a free-running position, and is pre-loaded in the direction of the holding position by means of a torsion spring 30.

The holding element 29 has a tapered section 29a which tapers into the direction of the basic frame 2 and on one side has an arcuate outer contour, a step- or hook-shaped holding section 29b as well as an end section 29c that projects downwards from the insert element 23. In the lower wall, the insert element 23 has an opening through which the end section 29c of the holding element 29 can project in the downwards direction.

The tapered section 29a of the holding element 29 is designed in such a manner and the arrangement is realized in such a manner that the ring 26 attached at the locking bolt 22 is engaged with the tapered section 29a and is moved along the arcuate outer contour of the section 29a when the locking bolt 22 is moved by a user from the locking position into the release position, and as a result of this the holding element 29 is pressed and pivoted from the holding position in the direction of the free-running position.

The mechanism further comprises a releasing element 31 that is held at the basic frame 2 so as to be movable between a retracted position and a projecting position. In FIG. 8, the releasing element 31 is shown in the retracted position. The releasing element 31 is pre-loaded in the direction of the projecting position by means of a coil spring 32. It has a ramp-shaped end area 31a that rises in a ramp-shaped manner in the direction of the extended end position and engages with the end area 29c of the holding element 29 when the sliding frame 7 is brought from the retracted front into the extended rear position or vice versa, wherein the end area 29c of the holding element 29 engages with the ramp-shaped end area 31a of the releasing element 31 shortly before reaching the retracted end position. In the projecting position, the ramp-shaped end area 31a projects in the direction of the sliding profile 9 to beyond the edge of the basic frame 2.

On the bottom side, the releasing element 31 has a bore hole, which cannot be seen in Figures, and is plugged onto a holding pin 33 that is fixated at the basic frame 2. The coil spring 32 extends about the holding pin 33 for pre-loading the releasing element 31 in the projecting position.

Here, the arrangement is realized in such a manner that, when the sliding frame 7 is brought into the extended rear position, the engaging end area 29c of the holding element 29 is moved in the rising direction over the ramp-shaped end area 31a of the releasing element 31 (right to left in the Figures), and the holding element 29 presses the releasing element 31 in the retracted position. But if by contrast the sliding frame 7 is brought (back) to the retracted front position, the engaging end area 29c of the holding element 29 abuts the higher side of the ramp-shaped end section 31a and in this way is moved from the holding position into the free-running position, whereby the locking bolt 22 is automatically released and the respective sliding frame 7 is automatically locked.

The load carrier 1 further comprises a functional device 34, which is movably held at the rear end of the basic frame 2. The functional device 34 comprises a basic carrier element 35 carrying a license plate holder and holding members 36 arranged on both lateral ends of the basic carrier element 35. Furthermore, a rear light unit 37 is arranged on both sides basic carrier element 35. Each rear light unit 37 is held at the holding member 36 and can be pivoted about a pivot axis relative to the holding member 36 between a use position shown in the figures, in which the rear light unit 37 are folded out and project in the transverse direction from the holding member 36, and a transport position, in which the rear light unit 37 are folded in behind the basic carrier element 35.

In concrete terms, each rear light unit 37 has a one-piece basic body 38, which carries two projections 39—an upper projection 39a and a lower projection 39b—spaced vertically apart from each other and protruding between corresponding C-legs 40 formed at the holding member 36 having an upper C-leg 40a and a lower C-leg 40b, which are both directed obliquely backwards and transversely outwards, as shown in FIGS. 1 and 2 for example.

A locking mechanism is assigned to each rear light unit 37 and designed in such a way that the rear light unit 37 can be locked in its transport position and in its use position. In concrete terms, the locking mechanism is arranged at the upper projection 39a of the rear light unit 37 and the upper C-leg 40a.

The functional device 34 is pivotably movable between a working position, in which the functional device 34 extends partially into the movement range of the sliding frame 7, and a clearance position, in which the functional device 34 is moved out of the movement range of the sliding frame 7, about a pivot axis Y. For this purpose, the functional device 34 is held at the basic frame 2 by means of two support elements 41, each of which is pivotally connected to the rear end section of the C-legs 3a, 3b of the basic frame 2 on their inner side. In concrete terms, each C-leg 3a, 3b carries a pivot pin 42 formed as a screw extending into corresponding holes formed in the support elements 41.

Each support element 41 is fixedly connected to the functional device 34. In concrete terms, each support element 42 comprises a supporting arm 43 extending from the pivot axis Y to the functional device 34. At their ends, the supporting arms 43 of the support elements 41 have a U-shaped recess 44 receiving the holding member 36 of the functional device 34. The basic carrier element 34 is screwed to the supporting arms 43 of the support elements 41.

In order to limit the pivot movement of the support elements 41 and of the functional device 34, each support element 41 has an oblong hole 45, into which a corresponding guide bolt 46 fixedly attached to the basic frame 2 extends. The oblong holes 45 of the support elements 41 have a curved shape extending along a circle about the pivot axis Y. The ends of the oblong holes 45 define the limits of the pivot movement of the support elements 41 and the functional device 34. When the functional device 34 is in its clearance position, the guide bolts 46 reach one end of the oblong holes 45.

The support elements 41 each comprise a coupling arm 47 extending from the pivot axis Y in the direction of the sliding frame 7. The angle between the supporting arm 43 and the coupling arm 47 is about 90°. The sliding frame 7 comprises at each sliding profile 9 one pusher dog pin 48 assigned to a corresponding support element 41. The pusher dog pins 48 are formed such that they release the functional device 34 and the support elements 41 allowing them to move in their clearance position, when the sliding frame 7 is moved out of its retracted front position. When the sliding frame 7 is moved into its retracted front position, the pusher dog pins 48 apply a momentum about the pivot axis Y by pushing against the coupling arm 47 of the support elements 41 in order to bring the functional device 34 into its working position, against the gravity force applying a momentum on the support elements 41 and the functional device 34 in the direction of their clearance position. In this way, the functional device 34 and the sliding frame 7 are coupled such that the functional device 34 is automatically moved into its clearance position, when the sliding frame 7 is moved out of the retracted front position in the direction of its extended rear position and the functional device 34 is automatically moved into its working position, when the sliding frame 7 is moved into the retracted front position.

The load carrier 1 further comprises a yoke 49, which is pivotably held at the front ends of the sliding profiles 9. This yoke 49 can be moved between a horizontal position, in which the yoke 49 lies on the sliding profiles 9 and a vertical position, in which the yoke 49 can be used to fix a load, for example a bicycle to the load carrier 1, as it is shown in FIGS. 1 to 4. The yoke 49 carries two bike frame holders 49a (shown in FIGS. 1 and 2), which serve to connect the frame of a bike to the yoke 49 in order to achieve a safe fixation of a bike on the load carrier 1.

FIGS. 10 and 11 show the use of the load carrier 1 according to the invention. By means of the coupling device 4, the load carrier 1 is fixed to the trailer hitch of a vehicle 50, the rear end section of which is shown. On FIGS. 10 and 11, the luggage compartment is shown, which has two luggage compartment doors 51 that are pivotable about a vertically extending pivot axis Z. In FIG. 10, the luggage compartment doors 51 are closed and the sliding frame 7 of the load carrier 1, which is equipped with two bicycles 52, is in its retracted front position.

If someone needs access to the luggage compartment and wants to open the luggage compartment doors 51, he can pull both locking bolts 22 into their release position in order to allow a movement of the sliding frame 7 relative to the basic frame 2. By bulling the sliding frame 7, in concrete terms the sliding profiles 9 via the intermediate sliding elements 10 relative to the basic frame 2, it is possible to bring the sliding frame 7 into its extended rear position, as shown in FIG. 11. Due to the intermediate sliding element 10, the displacement path of the sliding frame 7 relative to the basic frame 2 is extended compared to an arrangement whereby the sliding frame 7 is directly held at the basic frame 2 so that even large luggage compartment doors 51 as shown in FIGS. 10 and 11 can be opened without the need to dismount the load carrier 1 from the trailer hitch of the vehicle or to dismount the bicycles 52 from the carrier parts 8a, b. Furthermore, no vertical movement of the load, presently the bicycles 52, is necessary which means that the displacement of the sliding frame 7 relative to the basic frame 2 is possible manually without a significant amount of force.

LIST OF REFERENCE SIGNS

1 load carrier
2 basic frame
2*a*, 2*b* bent tube
3*a, b* C-leg
4 coupling device
5 lever
6 housing
7 sliding frame
8*a*, 8*b* carrier part
9 sliding profile
10 intermediate sliding element
11 engagement contour
12 counter contour
13 attachment profile
14*a*, 14*b*, 14*c*, 14*d* L-shaped protrusion
15 first L-leg
16 second L-leg
17 engagement profile
18 counter profile
19 L-shaped projection
20*a-g* stop block
21 locking device
22 locking bolt
23 insert element
24 screw
25 coil spring
26 ring
27 handle
28 locking recess
29 holding element
29*a* tapered section
29*b* holding section
29*c* end section
30 torsion spring
31 releasing element
31*a* end area
32 coil spring
33 holding pin
34 functional device
35 basic carrier element
36 holding member
37 rear light unit
38 basic body
39*a*, 39*b* projection
40*a*, 40*b* C-leg
41 support element
42 pivot pin
43 supporting arm
44 recess
45 oblong hole
46 guide bolt
47 coupling arm
48 pusher dog pin
49 yoke
49*a* bike frame holder
50 vehicle
51 door
52 bicycle
L longitudinal direction
X locking axis Y pivot axis
Z pivot axis

The invention claimed is:

1. Load carrier (1), in particular a load carrier (1) for bicycles (52) and/or luggage, for attachment to the rear side of a vehicle (50), with a basic structure having a basic frame (2) and a coupling device (4) for attachment to a vehicle arranged at a front end of the basic frame (2), a sliding frame (7) for receiving a load, in particular for receiving bicycles or a luggage box, wherein the sliding frame (7) is translationally moveable relative to the basic frame (2) between a retracted front position and an extended rear position, and at least one intermediate sliding element (10) is arranged between the basic frame (2) and the sliding frame (7) in such a way that the intermediate sliding element (10) is slidingly moveable relative to the basic frame and the sliding frame (7) is slidingly moveable relative to the intermediate sliding element (10) so that the sliding frame (7) is telescopically displaceable relative to the basic frame (2);

wherein the basic frame (2) has a C-shaped structure open towards the rear side, wherein a central C-leg (3*a*) extends transversely to a longitudinal direction (L) of the load carrier (1) and two C-legs (3*b*) extend parallel to each other towards the rear side of the load carrier (1);

wherein the C-shaped structure is formed by at least one bent round tube, which is welded at its central C-leg (3*a*) to the coupling device (4), in particular to a housing of the coupling device (4).

2. Load carrier (1) according to claim 1, wherein a displacement distance of the sliding frame (7) relative to the basic frame (2) between its retracted front position and its extended rear position is at least 60 cm.

3. Load carrier (1) according to claim 1, wherein a displacement distance of the sliding frame (7) relative to the basic frame (2) between its retracted front position and its extended rear position is at least 1.1 times the longitudinal extension of the load carrier, when the sliding frame (7) is in its retracted front position.

4. Load carrier (1) according to claim 1, wherein each intermediate sliding element (10) comprises an engagement contour (11) on its side facing towards the basic frame (2) and the basic frame (2) has a corresponding complementary counter contour (12), wherein the engagement contour (11) engages behind the counter contour (12) such that the intermediate sliding element (10) is slidingly movable relative to the basic frame (2) in a longitudinal direction, but fixed transversely to the longitudinal direction in a form-fit manner.

5. Load carrier (1) according to claim 4, wherein the engagement contour (11) and the counter contour (12) each comprise two L-shaped protrusions (14*a*, 14*b*; 14*c*, 14*d*), which are arranged such that the L-shaped protrusions (14*a*, 14*b*) of the engagement contour (11) engage behind the L-shaped protrusions of the counter contour (14*c*, 14*d*).

6. Load carrier (1) according to claim 5, wherein the L-shaped protrusions (14*a*, 14*b*; 14*c*, 14*d*) of the engagement contour (11) and/or of the counter contour (12) are arranged mirror-symmetrically in particular with respect to a longitudinal center plane of the intermediate sliding element (10).

7. Load carrier (1) according to claim 4, wherein the engagement contour (11) and/or the counter contour (12) and/or the engagement profile (17) and/or the counter profile are provided with a coating.

8. Load carrier (1) according to claim 1, wherein the sliding frame (7) comprises assigned to each intermediate sliding element (10) an engagement profile (17) on its side facing towards the intermediate sliding element (10) and the intermediate sliding element (10) has a corresponding complementary counter profile (18), wherein the engagement profile (17) engages behind the counter profile (18) such that the sliding frame (7) is slidably movable relative to the intermediate sliding element (10) in a longitudinal direction, but fixed transversely to the longitudinal direction in a form-fit manner.

9. Load carrier (1) according to claim 8, wherein the engagement profile (17) and the counter profile (18) each comprise two L-shaped projections (19), which are arranged such that the L-shaped projections (19) of the engagement profile (17) engage behind the L-shaped projections (19) of the counter profile.

10. Load carrier (1) according to claim 9, wherein the L-shaped projections (19) of the engagement profile (17) and/or of the counter profile (18) are arranged in a mirror symmetrical manner with respect to a longitudinal center plane of the intermediate sliding element (10).

11. Load carrier (1) according to claim 1, wherein the load carrier (1) comprises two intermediate sliding elements (10) spaced apart from each other and extending parallel to each other.

12. Load carrier (1) according to claim 1, wherein characterized in that the counter contour (12) of the basic frame is formed by an attachment profile (13), which is plugged onto a C-leg (3*b*) of the basic frame (2), wherein, in particular, the attachment profile (13) is an extruded aluminium profile.

13. Load carrier (1) according to claim 1, wherein the intermediate sliding element (10) is formed by an extruded hollow profile, in particular an aluminium profile.

14. Load carrier (1) according to claim 1, wherein the sliding frame (7) comprises assigned to each intermediate sliding element (10) one sliding profile (9), which has the engagement profile on its side facing towards the intermediate sliding element (10) and is in particular formed by an extruded aluminium profile.

15. Load carrier (1) according to claim 1, wherein the sliding frame (7) is arranged above the basic frame (2) so that the sliding frame (7) is arranged above the intermediate sliding element (10) and the intermediate sliding element (10) is arranged above the basic frame (2).

16. Load carrier (1) according to claim 1, wherein the basic frame (2) and the intermediate sliding element(s) (10) are arranged such that they do not protrude above the top of the coupling device (4).

17. Load carrier (1) according to claim 1, further comprising a locking device (21) is provided by means of which the sliding frame (7) can be locked at least in the retracted front position.

18. Load carrier (1) according to claim 17, wherein the locking device (21) comprises at least one locking bolt (22)

that is held at the basic frame (2) or the sliding frame (7) so as to be moveable between a blocked position and a release position, wherein the locking bolt (22) is pre-loaded in the direction of the blocked position, wherein a mechanism is provided, which is automatically activated as the locking bolt (22) is being transferred from the blocked position into the release position and which holds the locking bolt (22) in the release position, so that the sliding frame (7) can be freely displaced with respect to the basic frame (2), and which, when the sliding frame is being moved into the retracted front position, automatically releases locking bolt (22) either shortly before or upon reaching the retracted front position, so that the locking bolt (22) is moved into the blocking position and locking takes place.

19. Load carrier (1) according to claim 18, wherein the locking device (21) comprises a recess which is provided in the other one of the sliding frame (7) or the basic frame (2) and into which an end rear area of the locking bolt (22) engages when it is in the blocked position.

20. Load carrier (1) according to claim 18, wherein a holding element (29) is provided that has a holding section which automatically engages with a projection provided at the locking bolt (22), when the locking bolt (22) is transferred from the blocked position into the release position, wherein the projection preferably is formed by a retaining ring that encloses the locking bolt (22), and/or the holding element (29) is held at the one frame so as to be moveable between a holding position and a free-running position, in particular so as to be pivotable about a pivot axis, and particularly preferably is pre-loaded in the direction of the holding position.

21. Load carrier (1) according to claim 20, wherein the holding element has a step- or hook-shaped holding section, wherein, when the locking bolt (22) is in the release position and the holding element (29) is in the holding position, particularly preferably a bottom side of the projection provided at the locking bolt (22) rests on a top side of the holding section, and/or in that the holding element (29) has a tapered section (29*a*), which preferably tapers in the direction of the other frame, wherein the arrangement preferably is realized in such a manner that the projection provided at the locking bolt (22) is engaged with and moved along the tapered section (29*a*), when the locking bolt (22) is transferred from the blocked position into the release position.

22. Load carrier (1) according to claim 1, wherein the movement of the sliding frame (7) relative to the basic frame (2) is restricted by at least one end position stop at least in the extended rear position, preferably restricted by end position stops in both end positions.

23. Load carrier (1) according to claim 1, wherein one locking device (21) is assigned to each intermediate sliding element (10).

* * * * *